United States Patent
Babu et al.

(10) Patent No.: US 10,959,479 B1
(45) Date of Patent: Mar. 30, 2021

(54) APPARATUS AND WARNING SYSTEM FOR INTELLIGENT HELMET

(71) Applicant: Robert Bosch GmbH, Stuttgart (DE)

(72) Inventors: Benzun Pious Wisely Babu, San Jose, CA (US); Zeng Dai, Santa Clara, CA (US); Shabnam Ghaffarzadegan, San Mateo, CA (US); Liu Ren, Cupertino, CA (US)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 16/728,009

(22) Filed: Dec. 27, 2019

(51) Int. Cl.
| | |
|---|---|
| *A42B 3/30* | (2006.01) |
| *G08B 6/00* | (2006.01) |
| *B62J 45/41* | (2020.01) |
| *B62J 50/22* | (2020.01) |
| *H04N 7/18* | (2006.01) |

(52) U.S. Cl.
CPC ............... *A42B 3/303* (2013.01); *B62J 45/41* (2020.02); *B62J 50/22* (2020.02); *G08B 6/00* (2013.01); *H04N 7/18* (2013.01)

(58) Field of Classification Search
CPC combination set(s) only.
See application file for complete search history.

(56) References Cited

U.S. PATENT DOCUMENTS

| | | |
|---|---|---|
| 5,294,914 A | 3/1994 | Dallas |
| 2016/0073722 A1* | 3/2016 | Eustace .................. G08B 21/18 340/539.13 |

FOREIGN PATENT DOCUMENTS

CN 106372662 A 2/2017

OTHER PUBLICATIONS

Dennis et al., "Determinants of helmet wearing behavior among motorcyclists in the Dominican Republic", International Journal of Public Health and Epidemiology vol. 2 (1) pp. 050-055, Jan. 14, 2013, California, 7 pages.
"Motorcycle Helmet Use in 2018—Overall Results", National Highway Traffic Safety Administration: Traffic Safety Facts, Jul. 2019, 5 pages.
"Motorcycle Helmet Effectiveness Revisited", National Highway Traffic Safety Administration, DOT HS 809-715, Mar. 2004, 26 pages.

* cited by examiner

*Primary Examiner* — Thomas S McCormack
(74) *Attorney, Agent, or Firm* — Brooks Kushman P.C.

(57) ABSTRACT

A system for providing a rider of a saddle-ride vehicle, such as a motorcycle, with information about helmet usage is provided. A camera is mounted to the saddle-ride vehicle and faces the rider and monitor a rider of the vehicle and collect rider image data. A GPS system is configured to detect a location of the saddle-ride vehicle. A controller is in communication with the camera and the GPS system. The controller is configured to receive an image of the ruder from the camera, determine if the rider is wearing a helmet based on the rider image data, and output a helmet-worn indicator to the rider, in which the helmet-worn indicator varies based on the determined location of the saddle-ride vehicle.

17 Claims, 6 Drawing Sheets

APPARATUS AND WARNING SYSTEM FOR INTELLIGENT HELMET

TECHNICAL FIELD

The present disclosure relates to intelligent helmets, such as those utilized during riding of two-wheeler vehicles such as motorcycles and dirt bikes, three-wheeler vehicles, or four-wheeler vehicles such as all-terrain vehicles.

BACKGROUND

Continuous monitoring of a rider of a powered two-wheeler (PTW) such as a motorcycle may be difficult due to resource constraints, packaging constraints, and other limitations on PTWs. Standard automotive passenger vehicle safety systems may not be transferrable to PTWs due to these constraints and the difference in the environment and design.

PTWs may include Advanced Rider Assistance System (ARAS) to help with various functions, such as adaptive cruise control and blind-spot detection. ARAS systems may be utilized primarily to generate data of the PTW, and provide warning indicators to the rider to improve safety for the rider.

SUMMARY

According to one embodiment, a system for providing a rider of a saddle-ride vehicle with information about helmet usage is provided. The system includes a camera configured to mount to the saddle-ride vehicle and facing the rider and monitor a rider of the vehicle and collect rider image data; a GPS system configured to detect a location of the saddle-ride vehicle; and a controller in communication with the camera and the GPS system. The controller is configured to receive an image of the rider from the camera, determine if the rider is wearing a helmet based on the rider image data, receive a location of the saddle-ride vehicle from the GPS system, and output a helmet-worn indicator to the rider that varies based on whether the rider is wearing the helmet and the location of the saddle-ride vehicle.

In another embodiment, a saddle-ride vehicle includes a rider-facing camera configured to monitor a rider of the saddle-ride vehicle and collect rider image data; a GPS system configured to detect a location of the saddle-ride vehicle; a human-machine interface (HMI) configured to display vehicle information to the rider; and a controller in communication with a helmet-safety database that includes information regarding penalties for not wearing helmets in various locations, wherein the controller is configured to determine the rider is not wearing a helmet based on the rider image data, and in response to the rider not wearing the helmet, output a warning on the HMI that varies based on the location of the saddle-ride vehicle.

In another embodiment, a non-transitory computer-readable medium has stored instructions that, when executed by a computer processor, cause the computer processor to: receive force data from a force sensor in communication with a saddle-ride vehicle seat that indicates a force applied to the saddle-ride vehicle seat; receive rider image data from a rider-facing camera configured to monitor a rider of the saddle-ride vehicle; determine the rider is sitting on the seat in response to the force exceeding a threshold; in response to the determination that the rider is sitting on the seat, comparing the rider image data to a pre-trained model; and output a helmet-worn indicator to a human-machine interface (HMI) that varies based on the comparison of the rider image data and the pre-trained model.

DETAILED DESCRIPTION

Figure 1:
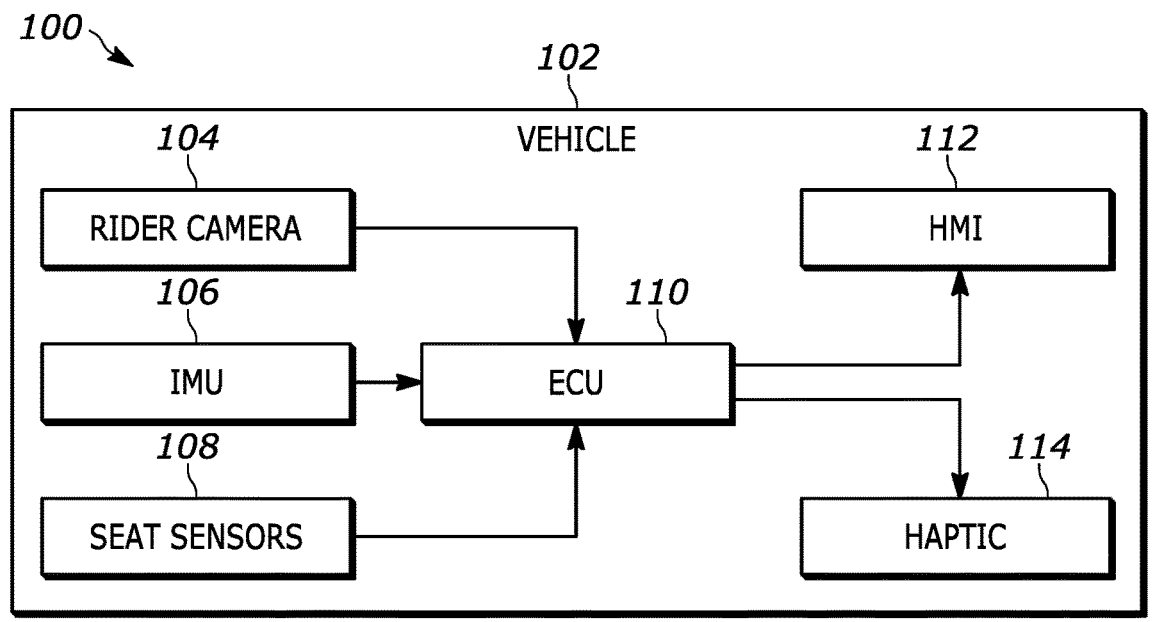
FIG. 1 illustrates an example of a system design for a saddle-ride vehicle such as a motorcycle, for example.

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

This disclosure makes references to helmets and saddle-ride vehicles. It should be understood that a "saddle-ride vehicle" typically refers to a motorcycle, but can include any type of automotive vehicle in which the driver typically sits on a saddle, and in which helmets are typically worn due to absence of a cabin to protect the riders. Other than a motorcycle, this can also include powered two-wheeler (PTW) vehicles such as dirt bikes, scooters, and the like. This can also include a powered three-wheeler, or a powered four-wheeler such as an all-terrain vehicle (ATV) and the like. Any references specifically to a motorcycle can also apply to any other saddle-ride vehicle, unless noted otherwise.

Helmets are preventative measures that improve safety in motorcycles, and seatbelts are preventative measure that improve safety in other vehicles. According to the National Highway Traffic Safety Administration (NHTSA), helmets are 37% effective in preventing fatal injuries to motorcycle riders, and 41% for motorcycle passengers (pillion riders). However, according to the NHTSA, only 71% of motorcycle riders used helmets in 2018, and nearly 41% of motorcycle fatalities in 2016 involved riders that were not wearing helmets. Due to the safety provided by helmets to riders, many states and countries mandate helmets for all drivers and pillion riders. Even so, riders sometimes avoid helmets and fail to adhere to safety laws.

Existing approaches for monitoring helmet use involves using roadside cameras to monitor traffic, and determining if helmets are being worn. Other helmet-warning systems involve using sensors mounted on the helmet to determine if it is worn. However, instrumenting additional sensors on the helmets increases the cost of the helmets and cannot be used with existing helmets available in the market.

Therefore, according to embodiments explained herein, a system is disclosed that provides status information about the helmet use to a driver of a saddle-ride vehicle. The system can provide timely alerts directly to the driver to ensure that the driver and the pillion rider(s) are wearing helmets properly. The system includes one or more sensors and processing units mounted on the saddle-ride vehicle itself, without requiring any modifications to the existing helmets. In other words, no sensors or processing units need to be fitted in the helmet itself, allowing the system to work with existing helmets in the market. With the information provided by the system, the rider can be alerted that the driver or rider is not wearing the helmet using visual, auditory, or haptic indicators, for example.

FIG. 1 is an example of a system design 100 for a saddle-ride vehicle 102 such as a motorcycle. The saddle-ride vehicle 102 may include one or more rider cameras 104. Each rider camera 104 can be toward the front of the saddle-ride vehicle and facing rearward, so that each rider camera 104 can view a respective rider. For example, one rider camera may be provided to face the driver, and another rider camera may be provided to face a pillion rider behind the driver. In another embodiment, one rider camera can be located at an angle (e.g., offset) so that it can view both the driver and the pillion rider. The rider camera 104 may be utilized to capture images or video of the rider that are in turn utilized for various calculations, such as identifying various body parts or movement of the rider.

The saddle-ride vehicle 102 may include an inertial measurement unit (IMU) 106. The IMU 106 may be mounted or otherwise attached to a front of the saddle-ride vehicle 102, such as the headlight or other similar area. The IMU 106 may collect inertial data that may be utilized to understand movement of the saddle-ride vehicle 102. For example, the IMU 106 may be or include a multiple axis accelerometer, such as a three-axis accelerometer, four-axis accelerometer, five-axis accelerometer, six-axis accelerometer, etc. The IMU 106 may work with a processor or controller (described below) to determine the saddle-ride vehicle's position relative to a reference point, as well as its orientation.

The saddle-ride vehicle 102 may include one or more seat sensors 108. The driver's seat may be equipped with one or more seat sensors, as well as the pillion seat (if such a seat is provided). The seat sensor 108 may include a force sensor located within the seat itself to output a signal to the processor or controller (described below) regarding the force located on the seat. If the force is above a threshold, the processor or controller can infer that a person is sitting on the seat. In another embodiment, a camera (such as the camera 104) may be the seat sensor, whereupon the processor or controller can receive one or more images from the camera and compare the images to various databases. For example, one database can be provided with images of what a seat appears like without a driver located on the seat, and another database can be provided with an image of what a seat appears like with a driver located on the seat. The processor or controller can receive the image, compare the image to the databases, and detect whether a driver is sitting on the seat based on the comparison. The databases may be pre-populated by the manufacturer of the saddle-ride vehicle. The seat sensor 108 may include a combination of the force sensor and the camera. In one embodiment, the processor or controller determines that a person is sitting on the seat if both the force sensor and the camera indicate so.

The saddle-ride vehicle 102 also includes an electric control unit (ECU) 110. The ECU may more generally be referred to as a controller, and can be any controller capable of receiving information from the various devices (such as the rider camera, the IMU, and the seat sensors, etc.) processing the information, and outputting instructions to a human-machine interface or haptic feedback systems, for example. In this disclosure, the terms "controller" and "system" may refer to, be part of, or include processor hardware (shared, dedicated, or group) that executes code and memory hardware (shared, dedicated, or group) that stores code executed by the processor hardware. The code is configured to provide the features of the controller and systems described herein. In one example, the controller may include a processor, memory, and non-volatile storage. The processor may include one or more devices selected from microprocessors, micro-controllers, digital signal processors, microcomputers, central processing units, field programmable gate arrays, programmable logic devices, state machines, logic circuits, analog circuits, digital circuits, or any other devices that manipulate signals (analog or digital) based on computer-executable instructions residing in memory. The memory may include a single memory device or a plurality of memory devices including, but not limited to, random access memory ("RAM"), volatile memory, non-volatile memory, static random-access memory ("SRAM"), dynamic random-access memory ("DRAM"), flash memory, cache memory, or any other device capable of storing information. The non-volatile storage may include one or more persistent data storage devices such as a hard drive, optical drive, tape drive, non-volatile solid-state device, or any other device capable of persistently storing information. The processor may be configured to read into memory and execute computer-executable instructions embodying one or more software programs residing in the non-volatile storage. Programs residing in the non-volatile storage may include or be part of an operating system or an application, and may be compiled or interpreted from computer programs created using a variety of programming languages and/or technologies, including, without limitation, and either alone or in combination, Java, C, C++, C#, Objective C, Fortran, Pascal, Java Script, Python, Perl, and PL/SQL. The computer-executable instructions of the programs may be configured, upon execution by the processor, to cause a visual, audible, or haptic feedback to be provided to the rider based on determinations that the rider's helmet is either not worn, or is not properly safe, as explained more fully herein.

Implementations of the subject matter and the operations described in this specification can be implemented in digital electronic circuitry, or in computer software embodied on a tangible medium, firmware, or hardware, including the structures disclosed in this specification and their structural equivalents, or in combinations of one or more of them. Implementations of the subject matter described in this specification can be implemented as one or more computer programs embodied on a tangible medium, i.e., one or more modules of computer program instructions, encoded on one or more computer storage media for execution by, or to control the operation of, a data processing apparatus. A computer storage medium can be, or be included in, a computer-readable storage device, a computer-readable storage substrate, a random or serial access memory array or device, or a combination of one or more of them. The computer storage medium can also be, or be included in, one or more separate components or media (e.g., multiple CDs, disks, or other storage devices). The computer storage medium may be tangible and non-transitory.

A computer program (also known as a program, software, software application, script, or code) can be written in any form of programming language, including compiled languages, interpreted languages, declarative languages, and procedural languages, and the computer program can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, libraries, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., a field programmable gate array ("FPGA") or an application specific integrated circuit ("ASIC"). Such a special purpose circuit may be referred to as a computer processor even if it is not a general-purpose processor.

The saddle-ride vehicle 102 also includes various outputs for alerting the driver that the helmet of one or more of the riders is not worn, not worn properly, is unsafe, etc. The outputs for alerts may be provided to a human-machine interface (HMI) 112, and/or to a haptic feedback system 114.

The HMI 112 provides a user interface that connects a driver of the saddle-ride vehicle 102 to the controller, such as the ECU. The HMI 112 may be in the form of an instrument cluster or screen. The screen may be a touch screen, for example, including touch-sensitive resistive/capacitive buttons. The HMI 112 may include or be part of a dash that provides vehicle information to the driver, such as vehicle speed, engine speed, fuel availability, fuel economy, and the like. As will be described herein, the HMI 112 may also provide the driver with information regarding the status of the helmet of the driver or other rider. For example, the HMI 112 may provide a visual alert to the driver that his or her helmet is not worn. An example of such a visual alert is provided in FIGS. 7A-7B, described below.

In addition (or alternative) to the HMI, the saddle-ride vehicle 102 can also provide helmet warnings to the driver via the haptic feedback system 114. The haptic feedback system 114 may include a vibrator, for example, that is configured to vibrate in response to a determination that the driver or rider is not wearing his or her helmet. The vibrator can be provided on various positions of the saddle-ride vehicle 102, such as the handles, the seat, the pedals, and the like. A haptic feedback in these locations will alert the driver that there is a message that should be delivered to the driver. The driver can then look to the HMI to see what visual notification is provided, such as a helmet-not-worn warning.

Figure 2:
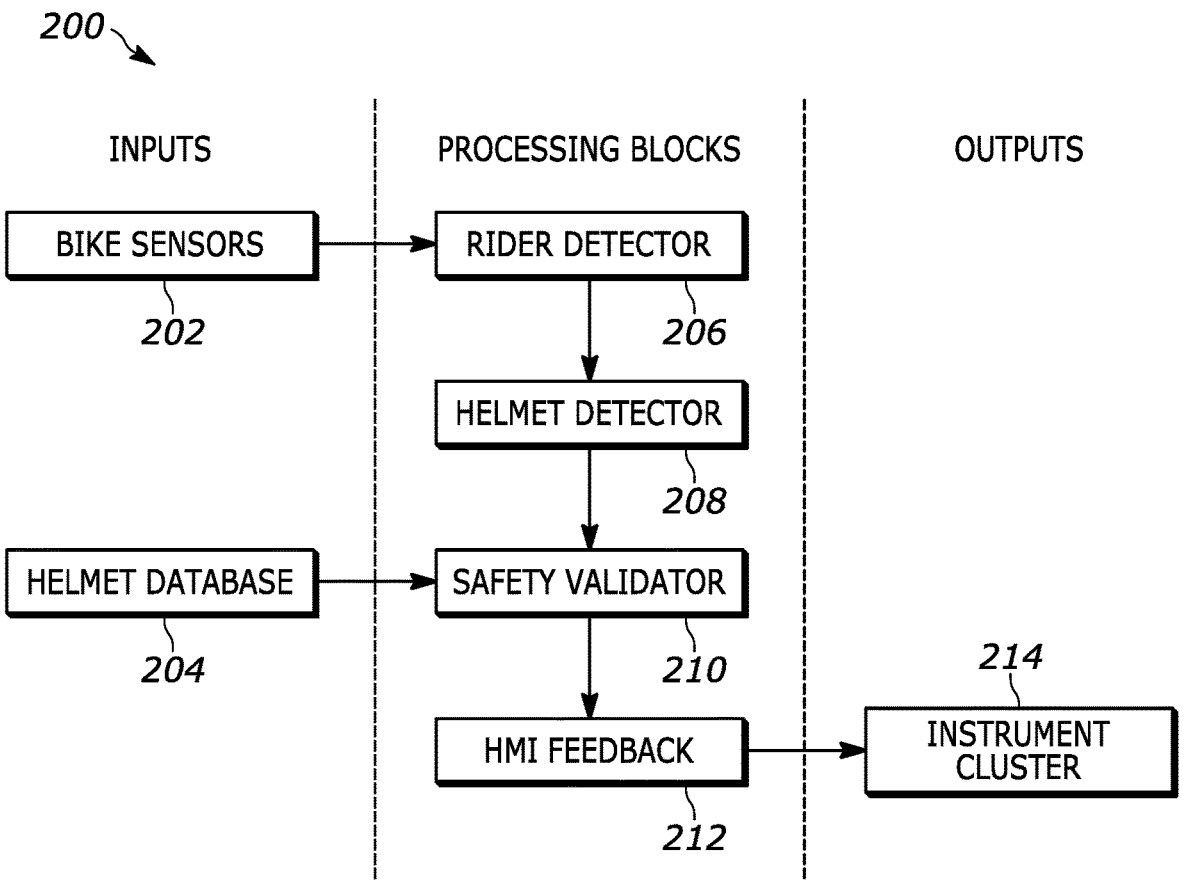
FIG. 2 illustrates a block diagram of a system 200 for providing a helmet-not-worn warning to the driver of the saddle-ride vehicle, for example.

FIG. 2 illustrates a block diagram of a system 200 for providing a helmet-not-worn warning to the driver of the saddle-ride vehicle. The system 200 includes various inputs, such as vehicle sensors 202 and a helmet database 204. The vehicle sensors 202 can include the rider camera 104, IMU 106, and seat sensors 108, for example. The helmet database 204 can be pre-programmed or stored on the memory associated with the controller. The helmet database 204 can include a plurality of stored images of various helmets. For example, images of many (if not all) commercially-available helmets can be provided to the controller. The images may be from various angles of each helmet, showing all sides thereof.

Figure 3:
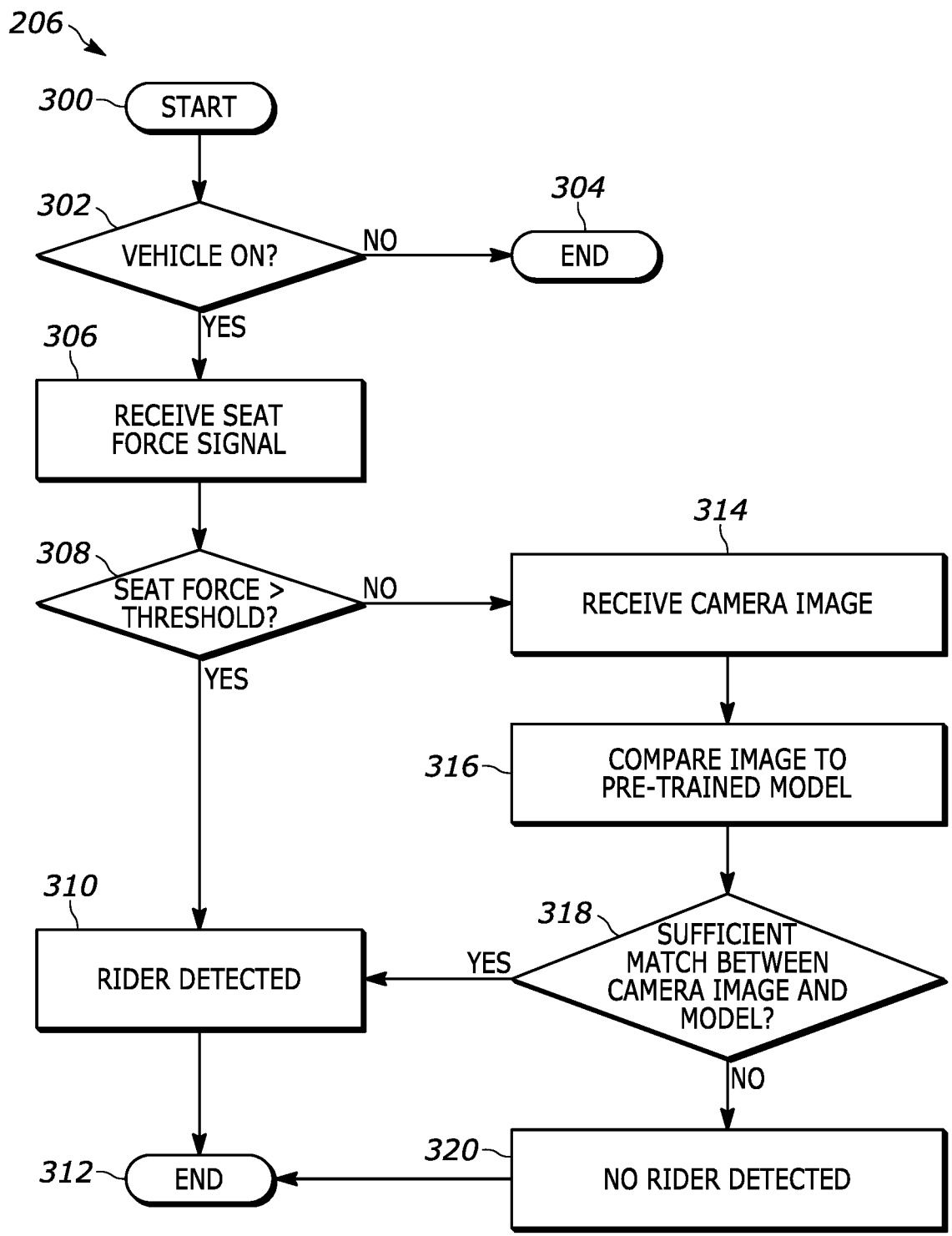
FIG. 3 illustrates one embodiment of a flow chart for a ride detector operation performed by a controller.
Figure 4:
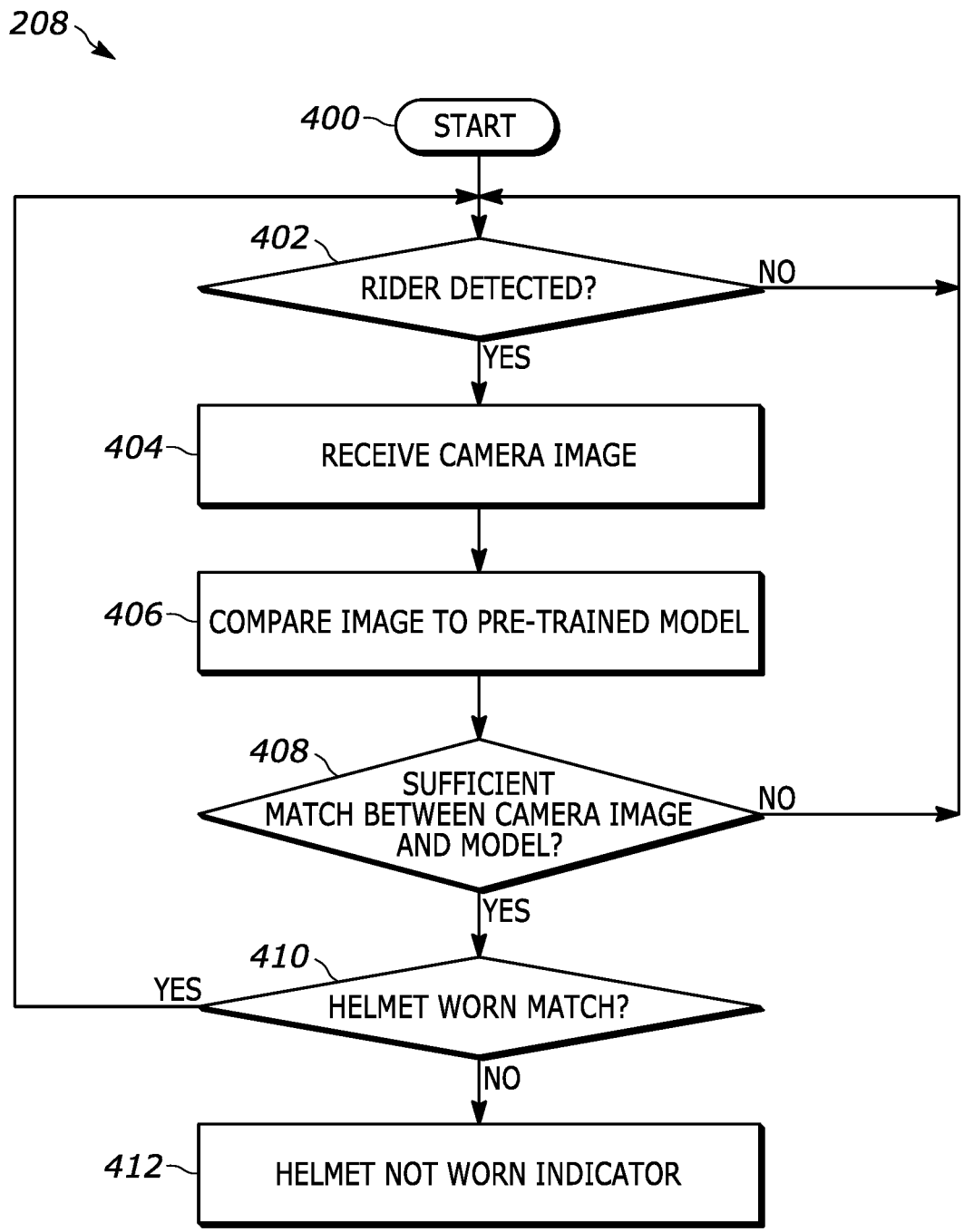
FIG. 4 illustrates one embodiment of a flow chart for a helmet detection operation performed by the controller.
Figure 5:
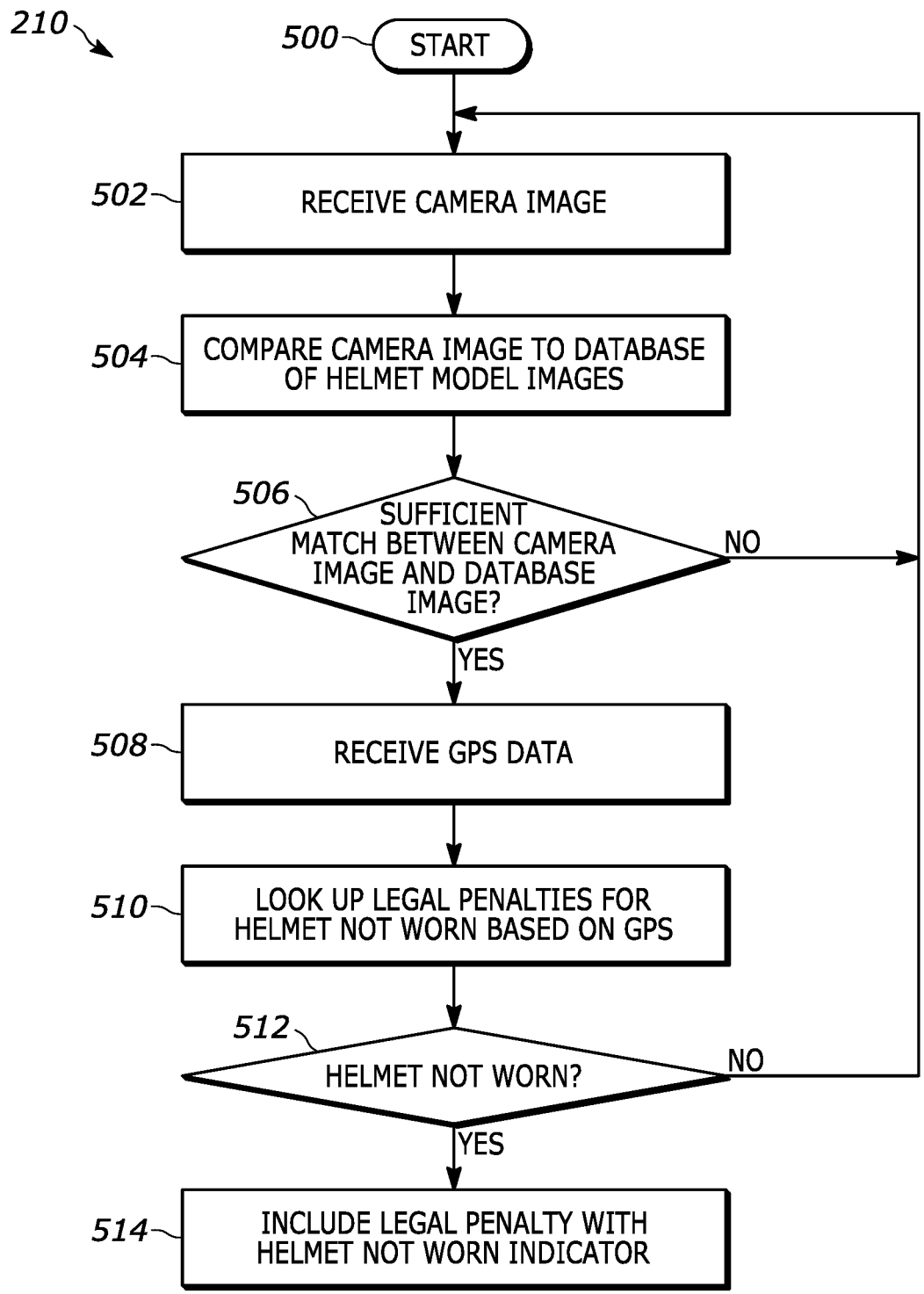
FIG. 5 illustrates one embodiment of a flow chart for a safety validation operation performed by the controller.
Figure 6:
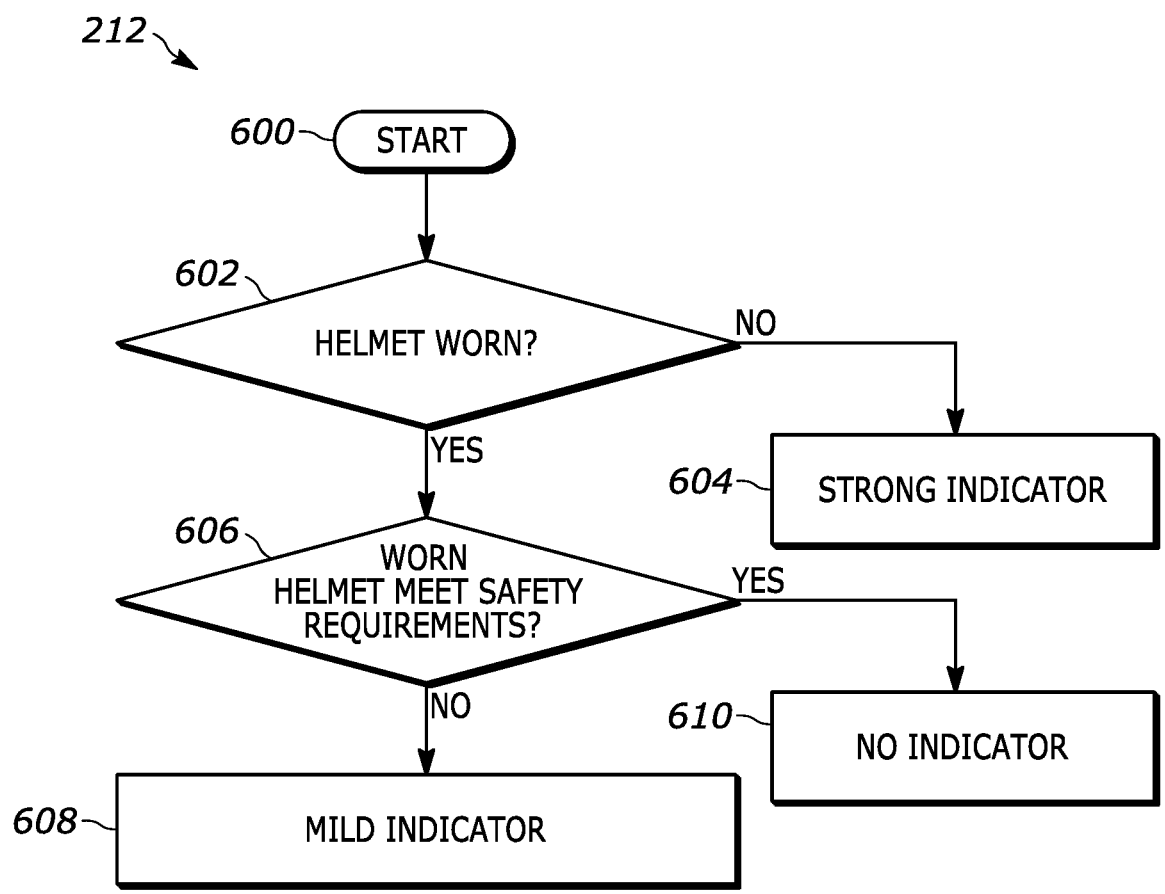
FIG. 6 illustrates one embodiment of a flow chart for a two-step indicator performed by the controller for providing various warnings to the driver.

Various algorithms are performed by the controller of the saddle-ride vehicle 102. For example, based on the vehicle sensors 202, the controller can perform a rider detector operation 206 as well as a helmet detector operation 208. FIG. 3 illustrates one embodiment of the ride detector operation 206, while FIG. 4 illustrates one embodiment of the helmet detector operation 208. Based on the helmet database 204 and the outputs of the ride detector operation 206 and the helmet detector operation 208, the controller can perform a safety validator operation 210. Based on the output of the safety validator operation, the controller can provide a HMI feedback operation 212, which can output a message to an instrument cluster 214, warning the driver that the driver's helmet or another rider's helmet is not worn. FIG. 5 illustrates one embodiment of the safety validator operation 210, and FIG. 6 illustrates one embodiment of the HMI feedback operation 212.

Referring to FIG. 3, one embodiment of the ride detector operation 206 is illustrated. The ride detector operation 206 can be performed by the controller, based on the input from the vehicle sensors 202. The operation starts at 300. At 302, the controller determines whether the saddle-ride vehicle is turned on. This can be performed by reviewing data signals sent from the ignition, the key receptacle, fueling data of the engine, and other methods. This can also be performed by looking at the electrical signal activity transferring through the data bus of the vehicle, along with the amount of power being sent from an on-board battery to the system to ready the system for ignition. If the saddle-ride vehicle is not on, the method ends at 304 and returns to continuously check for the vehicle to be activated. The continuous check can be at a low interval so as to not waste battery power.

If the saddle-ride vehicle is on, then at 306 the controller receives a seat force signal from the seat force sensors. This can indicate how much weight or force is placed on the seat. In one embodiment, a weight sensor is provided beneath the seat bottom. In another embodiment, the seat force signal can be generated from a sensory system inside the seat, which includes a pressure sensor, a silicone-filled bladder or container, and an associated ECU or controller such as that described above. When a person sits on the seat, the pressure sensor signals the occupant's weight to the controller.

At 308, the controller compares the seat force or weight to a threshold. For example, a threshold can be set at 100 pounds of weight or an equivalent force. If the detected force exceeds this threshold, the controller determines that a rider is sitting on the seat at 310. The method then ends at 312.

If, however, the seat force does not exceed the threshold at 308, then the controller can perform different processes to detect whether a rider may nonetheless be sitting on the seat. For example, at 314, the controller receives rider-image images from the camera that faces the rider. At 316, the controller compares those images from the camera to a pre-trained model. The pre-trained model can be a database of images of what it looks like for a person to be sitting on a seat, and other images of what it looks like for the seat to have no person sitting thereon. At 318, the controller can decide whether there is a sufficient match between the image received from the camera and a stored image of a person riding on the seat. If there is a sufficient match, then the controller determines that a rider is sitting on the seat. If there is no such sufficient match, then the controller determines that there is no rider sitting on the seat at 320.

Referring to FIG. 4, one embodiment of a helmet detection operation 208 is illustrated. The operation starts at 400. At 402, the controller determines if a rider is detected, using the operation shown in FIG. 3. If the rider is detected from step 310, then the controller receives a camera image at 404. This can be a similar step as 314, whereupon the camera facing the rider(s) will capture one or more images of the rider(s). Rather than a camera, in another embodiment one or more 3D sensors (e.g., LIDAR-based sensor) are utilized to detect the outline and shape of the rider's head and/or helmet. At 406, the controller compares the image received from the camera with a pretrained model. The pretrained model may be a database of various helmets, including multiple makes and models of helmets available on the market. The pretrained model can include images of helmets from many angles. Also, the pretrained model can include a 360-degree view of the helmet about one or more axes so that a fairly complete image of each helmet in the database is provided. The database of these images can be stored in memory coupled to the controller. The pretrained model can be generalized and improved by simulating different background environments. A contour method can be used to extract the edges of the helmet which is used to update a reference helmet model. Inputs from multiple image-captures from the camera as the rider moves can be used to update the helmet database. The images can first be stabilized and the intensity corrected before being used for prediction. If the helmet is detected, a 2D/3D model of the helmet can be estimated.

In some embodiments, the helmet-detection operation may end at 406. The comparison of the images received from the camera and the updating of images stored in the memory can be used for other algorithms and systems, such as separate indication systems or a safety validator as exemplified in FIG. 5. In this illustrated embodiment in FIG. 4, the system proceeds to 408, where the controller determines whether there is a sufficient match between the image received from the camera and the images within the pre-trained model. If there is no sufficient match, then the method can return to 402 to determine if a rider is detected.

If there is a sufficient match, then the method proceeds to 410 where the controller determines whether there is a helmet worn match. In this step, the controller will compare images of a person wearing a helmet stored in a database, with images captured from the camera. Similar to step 406, the controller can communicate with a pretrained model or database of images of persons wearing the particular helmet detected by the camera in 408. Multiple angles of images of the particular make/model of helmet on a person can be taken, and multiple people wearing the helmet can be stored as images in memory. If there is a sufficient match, then the controller will assume the helmet is properly worn by the rider, and the method can return to 402.

If, however, there is not a sufficient helmet-worn match, or if there is a match between an image of a person not wearing the helmet properly and the image captured by the camera, then at 412 the controller will assume the helmet is not properly worn. A helmet-not-worn indicator can be commanded by the controller. This indicator may be a visual, audible, or haptic feedback to the rider. For example, the controller can command the HMI to display a warning that the riders helmet is not worn properly. If the rider's helmet is equipped with one-way or two-way audio features that allow the helmet to communicate with the motorcycle or a mobile device that communicates with the vehicle, then the controller can access that system and send an audible alert to the rider that the helmet is either not worn or is not worn properly. The controller can also provide haptic feedback to the driver, indicating that the helmet is not worn properly. For example, the controller can cause the driver's seat to vibrate by issuing a command to a seat vibrator to actuate. In another embodiment, the controller can cause the handles to vibrate. In another embodiment, the controller can issue a command to the vehicle's brakes to slightly apply a brake force to the wheels for a very short time. Any of the above examples haptic feedback systems can be utilized in an attempt to cause the driver to look at the HMI for a message indicating that the driver or rider's helmet is not worn, or not worn properly.

The method illustrated in FIG. 4 can be performed continuously during a driving event. For example, the algorithm can be implemented once the controller detects that a driver is sitting on the seat, and will continuously run until the vehicle is turned off. In another embodiment, the algorithm initiates in response to a key-on event that starts the vehicle.

Referring to FIG. 5, one embodiment of a safety validator operation is illustrated. In this embodiment, the controller is configured to issue a multi-step (e.g., two-step) helmet-not-worn warning to the driver depending on the location of the saddle-ride vehicle 102. The process begins at 500. At 502, the controller receives one or more images from the on-vehicle camera, similar to steps 404 and 314 explained above. At 504, the controller compares the received camera image(s) to a database of helmet model images, or pre-trained models, similar to step 406 for example. Once again, in this step, the controller can analyze the contours and edges of the helmet and of the rider, for example. At 506, the controller determines whether there is a sufficient match between the received camera image and the database of images. This can be similar to step 408, for example.

In one embodiment, steps 502-506 can yield a decision of whether the rider is wearing, and properly wearing, his/her helmet. This can include all steps from the algorithm illustrated in FIG. 4. In other words, the safety validator operation of FIG. 5 may first start by determining if the rider and passenger's helmets are worn, and worn properly, pursuant to the method disclosed in FIG. 4.

After determining whether the helmet is worn and worn properly, the method proceeds to step 508 where the controller receives global positioning system (GPS) data of the location of the vehicle. The controller can access the on-board GPS system (e.g., transceivers configured to communicate with satellites and an associated GPS controller) on the vehicle that performs navigation, for example, to receive the information (e.g., coordinates) of the vehicle. GPS is one example of determining a location of the vehicle; in other embodiments, the controller accesses locational data from a global navigation satellite system (GLONASS), or the like. In another embodiment, the controller accesses the location of the vehicle by communicating to a mobile device (e.g., cellular phone, smart watch, other wearable device, etc.) that is connected to the vehicle during driving. For example, the mobile device may be connected to a receiver (e.g., Bluetooth low energy (BLE) receiver, near-field communication, ultraband, Zigbee, etc.) on the vehicle that is utilized during travel to share data, make phone calls, unlock the vehicle, start the vehicle, etc. With that communication established, the saddle-ride vehicle 102 can receive locational information from the mobile device carried by the driver.

At 510, the controller may access a database of legal penalties for not wearing a helmet based on the locational information of the vehicle. The database of legal penalties for each location may include a database of penalties per state or county in the United States, or per country. For example, Michigan may have no legal penalty for not wearing a helmet, but New York State may have a legal penalty (e.g., maximum of $100, 30 days in jail, or both) for not wearing a helmet. The database of legal penalties may be pre-programmed on the on-board memory on the vehicle accessed by the controller. Alternatively, the database may be located on the mobile device of the driver. In either embodiment, the database may be continuously updated to include the current laws.

At 512, the controller determines whether the driver and/or rider is wearing his/her helmet, and wearing it properly. This can be the same determination that is made by the algorithm in FIG. 4, for example. If the system arrives at a determination that the helmet is not worn or not worn properly, and a helmet-not-worn indicator (e.g., step 412) should be provided to the driver via the HMI for example, the helmet-not-worn indicator may include information regarding the legal penalty associated with the current location of the vehicle for driving or riding without a helmet being properly worn. Other information may be provided on the HMI based on the current helmet usage and the location of the vehicle. For example, the controller may cause visual text to appear that warns the driver that his/her helmet is not properly worn, and/or that it is illegal to continue riding with the helmet not properly worn. The details of the penalty (e.g., money and/or jail time) may be included on the warning provided on the HMI. In other embodiments, the warning is provided to the audio system on the driver's helmet speakers, as described above.

Figure 7A:
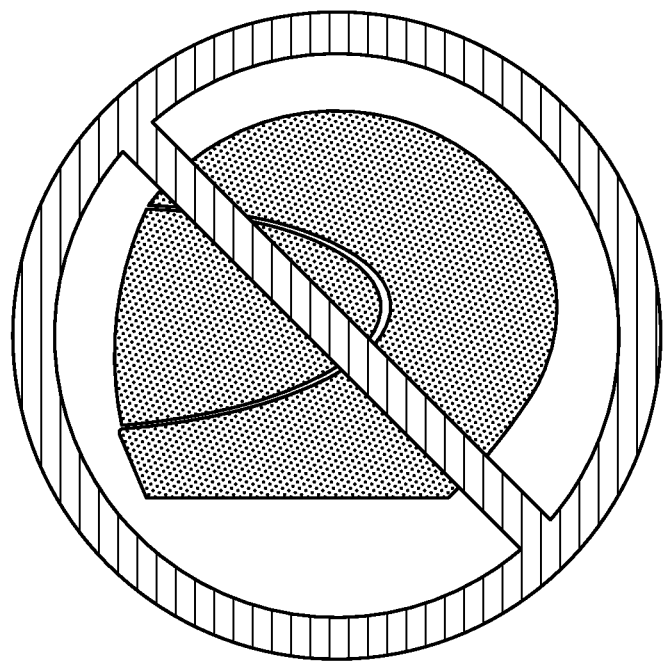
FIG. 7A illustrates one example of a strong indicator provided to the driver if, for example, the driver or rider's helmet is not worn.
Figure 7B:
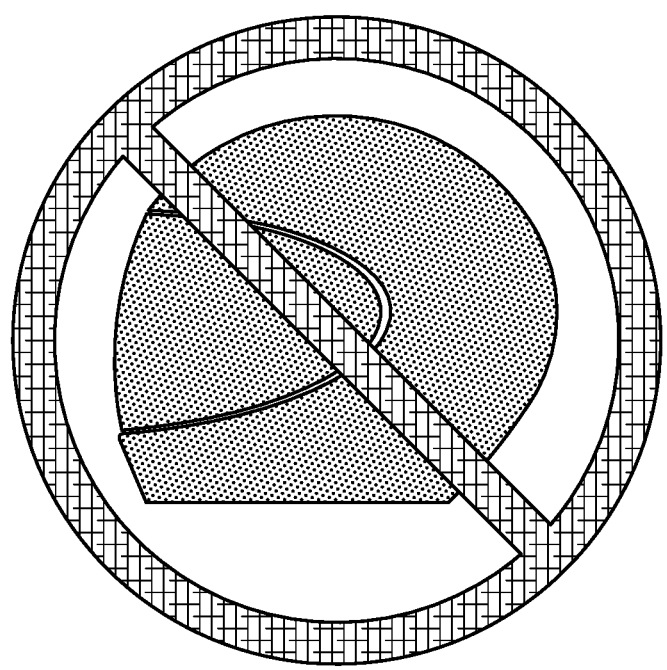
FIG. 7B illustrates one example of a mild indicator provided to the driver if, for example, the driver or rider's helmet is worn but not worn properly, or if the driver or rider is not wearing a helmet in a location where such activity is not illegal.

In one embodiment, a two-step indicator is utilized. One example of this is illustrated in FIG. 6. The algorithm starts at 600. At 602, the controller determines whether the helmet is worn and properly worn, similar to steps 506 or 410 above. If the helmet is not worn, then at 604 a strong indicator is provided to the driver. This can be performed by, for example, displaying a first helmet-not-worn indicator on the HMI, an example of which is illustrated in FIG. 7A having a red cross surrounding an image of a helmet. This indicates that it is illegal in the current location to be traveling on the vehicle without a properly-worn helmet. If the helmet is worn, then a determination of whether the worn helmet meets safety requirements is made at 606. This decision can be made, for example, by comparing the image from the camera to a database of properly worn helmets. Even though the helmet is worn by the driver, it may be not worn properly (e.g., worn too high or too low, or the identification of the helmet indicates that the helmet is old and no longer safe to wear, etc.). In another embodiment. If the helmet wearing does not meet safety requirements, then a mild indicator is provided to the driver at 608. This can be performed by, for example, displaying a second helmet-not-worn indicator on the HMI, an example of which is illustrated in FIG. 7B having a yellow cross surrounding an image of a helmet. This indicates that even though the helmet is worn, it may nonetheless not meet current safety requirements. Colors other than red and yellow can be utilized. If the helmet does meet safety requirements then no indicator is provided at 610.

In another embodiment, the decision to provide a mild indicator at 608 or no indicator at 610 may be made by determining whether or not wearing the helmet is against the current locational jurisdiction's law. For example, even if a positive decision is made at 602 that the driver or rider is wearing his/her helmet, an additional decision may be made regarding the current laws of the location of the vehicle. This may be made from the steps 510-514 described above. If the laws of the current location allow for drivers or riders to ride a saddle-ride vehicle without penalty, then a mild indicator may be provided to the driver even though the driver is wearing his/her helmet.

The processes, methods, or algorithms disclosed herein can be deliverable to/implemented by a processing device, controller, or computer, which can include any existing programmable electronic control unit or dedicated electronic control unit. Similarly, the processes, methods, or algorithms can be stored as data and instructions executable by a controller or computer in many forms including, but not limited to, information permanently stored on non-writable storage media such as ROM devices and information alterably stored on writeable storage media such as floppy disks, magnetic tapes, CDs, RAM devices, and other magnetic and optical media. The processes, methods, or algorithms can also be implemented in a software executable object. Alternatively, the processes, methods, or algorithms can be embodied in whole or in part using suitable hardware components, such as Application Specific Integrated Circuits (ASICs), Field-Programmable Gate Arrays (FPGAs), state machines, controllers or other hardware components or devices, or a combination of hardware, software and firmware components.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, to the extent any embodiments are described as less desirable than other embodiments or prior art implementations with respect to one or more characteristics, these embodiments are not outside the scope of the disclosure and can be desirable for particular applications.

What is claimed is:

1. A system for providing a rider of a saddle-ride vehicle with information about helmet usage, the system comprising:
a camera configured to mount to the saddle-ride vehicle facing the rider, monitor the rider, and collect rider image data;
a GPS system configured to detect a location of the saddle-ride vehicle; and
a controller in communication with the camera and the GPS system, and configured to:
receive an image of the rider from the camera,
determine if the rider is wearing a helmet based on the rider image data,
receive a location of the saddle-ride vehicle from the GPS system, and
output a helmet-worn indicator to the rider that varies based on whether the rider is wearing the helmet and the location of the saddle-ride vehicle;
wherein the controller is configured to communicate the location of the saddle-ride vehicle from the GPS system with a database to receive information regarding legality of helmet usage, and alter the helmet-worn indicator based on the legality of helmet usage in the received location.

2. The system of claim 1, wherein the controller is configured to output the helmet-worn indicator on a human-machine interface (HMI) display on the saddle-ride vehicle.

3. The system of claim 2, wherein the controller is configured to output a mild helmet-worn indicator on the HMI in response to a determination that the rider is not wearing the helmet and the saddle-ride vehicle is in a location where it is legal to ride the saddle-ride vehicle without a worn helmet.

4. The system of claim 3, wherein the controller is configured to output a stronger helmet-worn indicator on the HMI in response to the determination that the rider is not wearing the helmet and the saddle-ride vehicle is in a location where it is illegal to ride the saddle-ride vehicle without a worn helmet.

5. The system of claim 1, wherein the controller is configured to output the helmet-worn indicator via a haptic feedback system.

6. The system of claim 5, further comprising a vibrator configured to mount to a seat of the saddle-ride vehicle, wherein the controller is configured to activate the vibrator in response to a determination that the rider is not wearing the helmet and the saddle-ride vehicle is in a location where it is illegal to ride the saddle-ride vehicle without a worn helmet.

7. A saddle-ride vehicle comprising:
a rider-facing camera configured to monitor a rider of the saddle-ride vehicle and collect rider image data;
a GPS system configured to detect a location of the saddle-ride vehicle;
a human-machine interface (HMI) configured to display vehicle information to the rider; and
a controller in communication with a helmet-safety database that includes information regarding penalties for not wearing helmets in various locations, wherein the controller is configured to:
determine the rider is not wearing a helmet based on the rider image data, and
in response to the rider not wearing the helmet, output a warning on the HMI that varies based on the location of the saddle-ride vehicle.

8. The saddle-ride vehicle of claim 7, wherein the controller is configured to output a first warning on the HMI in response to the location of the saddle-ride vehicle corresponding to a first location in which there is no penalty for not wearing a helmet.

9. The saddle-ride vehicle of claim 8, wherein the first warning is displayed in a first color.

10. The saddle-ride vehicle of claim 9, wherein the controller is configured to output a second warning on the HMI in response to the location of the saddle-ride vehicle corresponding to a second location in which there is a penalty for not wearing a helmet.

11. The saddle-ride vehicle of claim 10, wherein the second warning is displayed in a second color different than the first color.

12. The saddle-ride vehicle of claim 10, wherein the second warning includes information regarding the penalty for not wearing the helmet.

13. The saddle-ride vehicle of claim 7, wherein the controller is configured to determine that the rider is wearing the helmet incorrectly based on the rider image data.

14. The saddle-ride vehicle of claim 13, wherein the controller is configured to output a second warning on the HMI in response to the helmet being worn incorrectly.

15. A non-transitory computer-readable medium storing instructions that, when executed by a computer processor, cause the computer processor to:
receive force data from a force sensor in communication with a saddle-ride vehicle seat that indicates a force applied to the saddle-ride vehicle seat;
receive rider image data from a rider-facing camera configured to monitor a rider of the saddle-ride vehicle;
determine the rider is sitting on the seat in response to the force exceeding a threshold;
in response to the determination that the rider is sitting on the seat, comparing the rider image data to a pre-trained model;
output a helmet-worn indicator to a human-machine interface (HMI) that varies based on the comparison of the rider image data and the pre-trained model;
receive a location of the saddle-ride vehicle from a GPS system;
retrieve information regarding penalties for not wearing helmets in the location of the saddle-ride vehicle; and
alter the helmet-worn indicator based on the location of the saddle-ride vehicle.

16. The medium of claim 15, wherein the helmet-worn indicator includes:
a first indicator of a first intensity based on the vehicle being in a first location in which it is legal to ride the vehicle without a helmet, and
a second indicator of a second intensity based on the vehicle being in a second location in which it is illegal to ride the vehicle without a helmet.

17. The medium of claim 16, wherein the first indicator includes a first image with a first color displayed on the HMI, and the second indicator includes a second image with a second color displayed on the HMI that is different than the first color.

* * * * *